United States Patent
Kamiya et al.

(10) Patent No.: US 6,957,875 B2
(45) Date of Patent: Oct. 25, 2005

(54) VEHICLE BRAKE SQUEAL CONTROL DEVICE

(75) Inventors: Masahiko Kamiya, Kariya (JP); Hiroshi Kondo, Kariya (JP); Shin Sasaki, Kariya (JP); Daizo Oba, Kariya (JP); Moriharu Sakai, Kariya (JP)

(73) Assignee: Advics Co., Ltd., Kariya (JP)

( * ) Notice: Subject to any disclaimer, the term of this patent is extended or adjusted under 35 U.S.C. 154(b) by 0 days.

(21) Appl. No.: 10/776,272

(22) Filed: Feb. 12, 2004

(65) Prior Publication Data

US 2004/0174067 A1    Sep. 9, 2004

(30) Foreign Application Priority Data

Mar. 7, 2003  (JP)  ............................. 2003-061057
Mar. 24, 2003  (JP)  ............................. 2003-079893

(51) Int. Cl.$^7$ ............................. B60T 8/32; F16D 65/38
(52) U.S. Cl. .................................. 303/191; 188/73.35
(58) Field of Search .................... 188/73.35, 73.36, 188/73.37, 1.11 R, 1.11 E; 303/191; 701/70, 701/71

(56) References Cited

U.S. PATENT DOCUMENTS 4,743,074 A * 5/1988 Inoue ........................ 303/191
5,108,159 A * 4/1992 Tsang et al. ................ 303/191
5,865,515 A * 2/1999 Nishizawa ................ 188/73.37
6,125,974 A * 10/2000 Nishizawa et al. ...... 188/73.37

FOREIGN PATENT DOCUMENTS

| JP | 54-156079 | 12/1979 | |
| JP | 04-054325 | 2/1992 | |
| JP | 09-221013 | 8/1997 | |
| JP | 11-278229 | 10/1999 | |
| JP | 2000-344072 | 12/2000 | |
| KR | 2003009605 A | * 2/2003 | ........... B60T 17/00 |
| KR | 2003089858 A | * 11/2003 | ........... F16D 66/00 |
| WO | WO 96/16850 | 6/1996 | |

* cited by examiner

Primary Examiner—Thomas Williams
(74) Attorney, Agent, or Firm—Buchanan Ingersoll PC

(57) ABSTRACT

A brake squeal control device is proposed which carries out squeal control by specifying travel state and temperature conditions in which brake noise tends to be produced. The brake squeal control device is adapted to feed detection signals from a sensor group that indicates the travel state of the vehicle from a stepping force sensor or wheel speed sensors, and a sensor group that indicates the temperature state from an engine cooling water temperature sensor, a car compartment temperature sensor, a caliper temperature sensor or an outer air temperature sensor to a control circuit. If conditions corresponding to an "in-the-cold" and "first-in-the-morning" states are detected by computing in the control circuit, a solenoid valve is turned on and off to suppress brake squeals.

10 Claims, 7 Drawing Sheets

VEHICLE BRAKE SQUEAL CONTROL DEVICE

BACKGROUND OF THE INVENTION

This invention relates to a vehicle brake squeal control device for suppressing so-called squeal phenomenon which develops from the brakes of a vehicle such as an automobile during braking.

So-called brake squeal that develops during braking by the brakes of a vehicle include relatively low-frequency sounds called groaning and irritating sounds in high-frequency bands of not less than several KHz (squeals). Various measures have heretofore been proposed to eliminate or reduce them. As one example, a vehicle brake device which has measures to prevent brake squeals is disclosed in JP patent publication 4-54325. The measures comprises a vibration detecting means for detecting vibrations by the piezoelectric effect of a piezoelectric element, and an oscillating means for damping the detected vibrations with the reverse piezoelectric effect of the piezoelectric element mounted on a friction member of the brake to prevent vibrations, thereby eliminating brake squeals.

Another brake control device is known from JP patent publication 11-278229. This control device comprises a control means for generating braking force corresponding to a detection signal from a sensor for detecting the stepping force of the brake pedal. While the brakes are being actuated, if the vehicle speed becomes below a predetermined value, the braking force of the brake device is changed at a predetermined cycle to suppress the resonance of various constituent members of the brake device.

Further, a brake noise preventive device of JP patent publication 2000-344072 is known. With this device, brake torque and vibrations of calipers are detected during braking while traveling at a speed below a predetermined value, and if they are above predetermined values and generation of noise is detected, a valve provided between the brake device and a reservoir is opened to reduce the brake pressure, or a valve provided between the brake device and a pressure accumulator is opened to increase the brake pressure, thereby preventing noise.

Another disk brake structure using brake squeal preventive measures disclosed in JP utility model publication 54-156079 is known. This disk brake is formed by bringing two pads held by a caliper into contact with a disk rotor by a brake cylinder, and shims are mounted on pad backing metals pressing two pads. The shims have a rubber member disposed between two steel plates.

By providing shims having a rubber coating on both sides of a steel plate provided between a brake pad and a mechanism for pressing it, excellent squeal preventive effect is obtained. But since the shims have poor durability, two steel plates are used to improve their durability and a rubber member is disposed therebetween to improve durability and ensure the squeal preventive effect by the shims.

Further, another brake hydraulic pressure control device is disclosed in JP patent publication 9-221013. It has a means for detecting brake squeals and a controller for changing the distribution ratio of brake hydraulic pressure to the front and rear wheels based on the squeal detection signals. If brake squeals are detected, control is made to reduce the distribution of the brake hydraulic pressure for the front wheels and increase it for the rear wheels.

Complicated factors are involved in brake squeal phenomena, and fundamental analysis about the causes of development of such squeals is needed. But in spite of various proposals made in these prior patent publications, no solution for fundamental factors has been made yet. About brake squeal phenomena, it is said that in a specific frequency band (7–9 KHz) squeals are large and rigid body vibration and bending vibration coexist. While they are irritating to the ear of the driver, such a noise is not always produced during braking. From experience, it is known that such a noise tends to be produced in the cold state or first in the morning.

But in any of the brake devices or control devices of JP patent publications 4-54325, 11-278229 and 2000-344072, consideration is scarcely given as to under what conditions brake squeal phenomena tend to occur. Thus, measures against prevention of squeals are not sufficient. For example, in JP patent publication 4-54325, vibrations are detected by a piezoelectric element and they are cancelled by the reverse piezoelectric effect of the piezoelectric element of the oscillating means. Thus, it is necessary to continuously actuate the device during travel to always detect vibrations irrespective of the conditions such as the temperature, braking force and number of revolutions when brake squeal phenomena occur.

Also, the detection ability of the piezoelectric element for sensing vibration is not uniform over the entire frequency range. Thus it will not respond in a specific frequency band. The brake control device of JP patent publication 11-278229 merely suppresses a resonance state only under conditions about the variation of the braking force. No consideration is given at all to other conditions such as temperature conditions and travel time. Also, simply by suppressing the resonance state, it is impossible to efficiently suppress squeal phenomena.

With the brake noise preventive device of JP patent publication 2000-344072, too, noise prevention is made only at caliper vibration above predetermined value, predetermined vehicle speed and brake pressure increasing or reducing. Thus, as with JP patent publication 11-278229, noise preventive measures are not sufficient. Also, brake squeals are produced not only during forward movement but during backward movement. There are none that have given consideration thereto.

Squeals are not always produced when braking is carried out. From experience, it is known that squeals normally tend to be produced in the cold of the calipers or after being left for a long time. But in the control devices disclosed in JP utility model publication 54-156079 and JP patent publication 9-221013, the fact that squeals tend to be produced in such a specific period is not considered at all. It is expected that the control devices of JP patent publications 54-156079 and 9-221013 can achieve the object of controlling squeals in a normal state (in which the temperature is stable) to a certain extent.

But the effect of suppressing squeals is small in the cold of the calipers or in a non-stable state after being left for a long time. This is because in the disk brake structure of JP patent publication 54-156079, only the durability of the shims have been improved, and simply by providing the shims, it is impossible to completely suppress squeals in a non-stable state. Also, in the control device of JP patent publication 9-221013, if squeals are detected, distribution of hydraulic pressure to the front and rear wheels is merely changed, so that the effect of suppressing squeals in the cold or after being left for a long time cannot be expected.

An object of this invention is to provide a brake squeal control device in which instead of carrying out squeal suppressing only with detection of the state which does not necessarily meet conditions of development of brake noise such as caliper vibration or a vehicle speed below a predetermined value, travel state and temperature conditions in which brake noise actually tends to be produced are specified to carry out squeal control. The brake squeal control device also provides control for suppressing brake noise during reversing.

The second object of the present invention is to provide a brake squeal control device in which the period or state in which brake squeals tend to occur most is specified, and in such a period or state, specific members of the brake means which can be the cause of brake squeals are actuated to build heat.

SUMMARY OF THE INVENTION

According to this invention, as a means to solve the first object, there is provided a brake squeal control device wherein after closing a starter switch of a vehicle, based on signals of sensors and a clock, if it is detected that the vehicle is in predetermined "in-the-cold" or "first-in-the-morning" state from the fact that at least one of time, travel state and temperature conditions is in predetermined ranges, the pressing force of a brake means is controlled to suppress brake squeals.

With the brake squeal control device of this invention, if a predetermined "in-the-cold" or "first-in-the-morning" state is detected by signals of a sensor and a clock that indicate these conditions, brake squeal control is carried out by controlling the pressing force of the brake means. Thus, this brake squeal control is carried out irrespective of whether brake squeal phenomena have actually developed or not. Brake squeal phenomena tend to develop when relatively weakly braked the brake pad surfaces in the process of cooling from high temperature and the first in the morning.

Thus, irrespective of whether brake squeal phenomena have occurred, travel state and temperature conditions in which the probability of development of brake squeal phenomena is high are specified, and brake squeal control is carried out if these conditions are met, irrespective of whether brake squeals have occurred. Thus, squeal control is not always carried out when the brake means is first actuated after the first start in the morning.

Also, for suppressing brake squeals during backward travel of a vehicle, there is provided a brake squeal control device wherein after closing a starter switch of the vehicle, if a signal of a sensor that indicates that it is in a backing state is detected, the pressing force of the brake is controlled to suppress brake squeals. If a signal indicating that the shift lever for changing over the vehicle to a reverse state is in its reverse position, and wheel speed signals from wheel speed sensors indicating the reverse state are detected, brake squeal control is carried out. As a method of determining the reverse state, besides the abovementioned methods, a method using a yaw rate sensor as disclosed in JP patent publication 11-501592, or any other known method may be used.

As a means for solving the second object, there is provided a brake squeal control device wherein the pressing force of the brake means is controlled by giving a control signal for imparting minute brake actions to the brake means during travel to preheat the brake means. It is preferably provided with a sensor and a switch that indicate the "in-the-cold" period of the calipers of the brake means, or a start state after being left for a long time to detect the "in-the-cold" period of the calipers or the start state after being left for a long time.

Otherwise, the pressing force of the brake means may be controlled by giving a control signal for imparting minute vibrating brake actions to the brake means during travel or while the vehicle is at a stop to preheat the brake means. It is preferably provided with a sensor and a switch that indicate the "in-the-cold" period of the calipers of the brake means, or a start state after being left for a long time to detect the in-the-cold period of the calipers or the start state after being left for a long time.

In another brake squeal control devices of this invention, the period or state as a "in-the-cold" state in which brake squeals tend to be produced most is specified as a "caliper in-the-cold" period or a period being left for a long time, and actuating members of the brake means which are the cause of brake squeals are actuated in this period to cause them to built heat, thereby returning the actuating members to an ordinary use state. During the "caliper in-the-cold" period, detection is made by computing based on signals from temperature sensors and when left for a long time, based on signals of a switch indicating this state. That is, if a temperature sensor mounted on the caliper detects that it is not more than a predetermined temperature, it is determined as "caliper in-the-cold" period. Also, when the starter switch is closed, based on the switch signal, elapsed time from the end of previous travel is calculated, and if it is not less than a predetermined value, determination is made that the vehicle has been left for a long time.

If such a period or state is detected, based on the detection signals, a squeal control signal is given during travel of the vehicle. In one embodiment, without stepping the brake pedal, minute braking actions are imparted to the brake means. The brake is actuated during travel to heat the brake means using heat due to friction with the rotor, thereby returning the brake means to an ordinary operating state. Also, in another embodiment, without stepping the brake pedal, minute vibrating actions are imparted to the brake means. In this case, by repeatedly actuating the brake while the vehicle is at a stop or traveling to heat the brake means with sliding heat produced internally, thereby returning the brake means to an ordinary operating state.

In the brake squeal control device of this invention, if a predetermined "in-the-cold" and "first-in-the-morning" state are detected by a sensor indicating a travel state and a sensor indicating temperature states, by controlling the pressing force of the brake means, brake actions are changed to suppress brake squeals. Thus, instead of controlling brake squeals simply by detecting vibrations or a vehicle speed not more than a predetermined value, conditions in which brake noise tends to be produced most are specified to carry out brake squeal control. Thus, an effect is obtained that brake squeals can be more reliably suppressed.

In the brake squeal control devices of this invention, control is carried out to impart minute brake actions to the brake means during travel, or impart minute vibrating brake actions to the brake means while the vehicle is at a stop or traveling to impart heat buildup. Thus, an effect is obtained that by actuating brake means during travel or while the vehicle is at a stop without stepping the brake pedal, it is possible to reliably reduce or eliminate the development of squeals of the brake means.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENT

Figure 1:
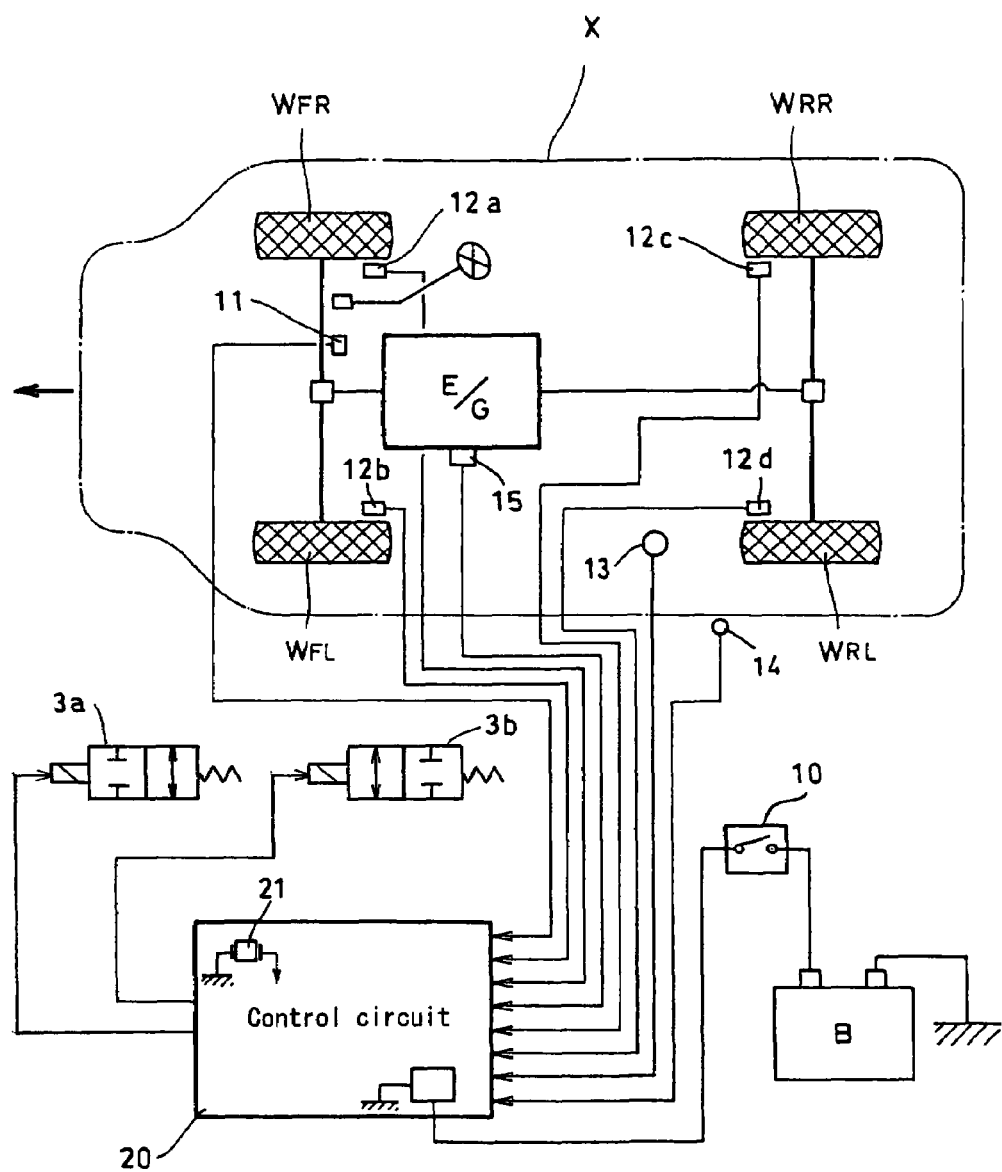
FIG. 1 is a schematic view showing the structure of the vehicle brake squeal control device embodying this invention.
Figure 2:
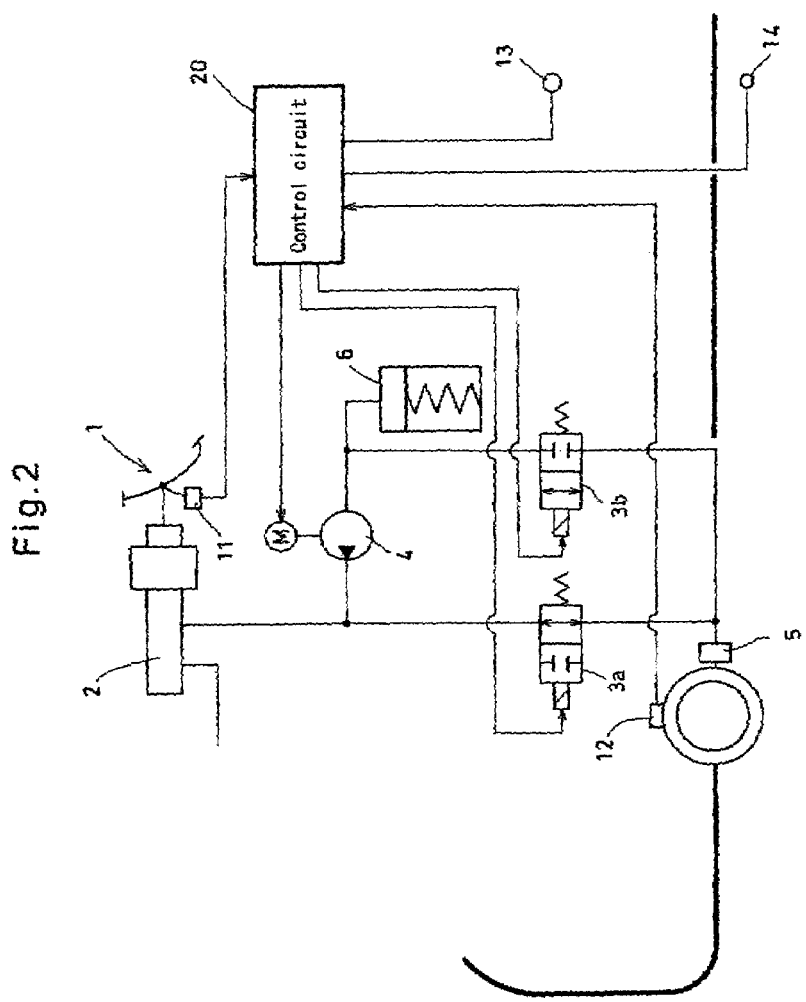
FIG. 2 is a schematic view of a brake device on which the control device of FIG. 1 is to be installed.

The embodiments of this invention will be described with reference to the drawings. FIG. 1 is a schematic diagram of the brake squeal control device of the first embodiment. FIG. 2 shows a structural view of the brake squeal control device including a brake device for one wheel. As shown, the vehicle X includes a brake hydraulic circuit (described later) for brake means such as disk brakes for actuating braking with the brakes 5, and a control circuit 20 for sending control signals to solenoid valves 3a, 3b provided in the hydraulic circuit. Signals from various sensors for controlling brake squeals are sent to the control circuit 20. The sensors include a sensor group for sensing the travel state of the vehicle and a sensor group for sensing temperatures such as the engine water temperature.

The brake hydraulic circuit is a means for specific control for reducing the development of squeals. As shown in FIG. 2, the stepping force of the brake pedal 1 is amplified by a master cylinder 2 and the hydraulic pressure obtained is sent through the solenoid valve 3a, which is a hold valve, to the brake 5 for braking. The solenoid valve 3, which is a hold valve, is a normally open two-position changeover valve, and the solenoid valve 3b, which is a decay valve, is a normally closed valve. They are on-off controlled by signals from the control circuit 20. The solenoid valves 3a, 3b are provided for all four wheels. But for simplicity, only those for one wheel are shown. A pump 4 and a reservoir 6 are provided.

In this brake hydraulic circuit, when the brake pedal 1 is stepped, the hydraulic pressure produced in the master cylinder 2 is sent to the brake 5 through the solenoid valve 3a, which is open, so that the brake is actuated. During braking, the solenoid valve 3b is kept closed. When the brake pedal 1 is released, fluid in the brake 5 is returned through the solenoid valve 3a into the master cylinder 2, so that the brake is released. In carrying out such basic braking action, the illustrated brake hydraulic circuit is structured so that ABS (antilock) control is possible. The program for ABS control is stored in the control circuit 20. But since an ABS control program itself is known, it will be simply explained here.

In ABS control, based on the input signals from wheel speed sensors 12a–12d, the wheel speeds are computed, from which referring to the value of deceleration sensed by a G sensor (not shown), the vehicle body speed is estimated. Based on the estimated vehicle body speed, the solenoid valve 3b is opened only for a short time (with solenoid valve 3a closed) to release locking of wheels, and the solenoid valve 3b is closed to re-pressurize the wheels for braking. These actions are repeated to recover reduced friction coefficient as much as possible to perform effective control. Brake fluid discharged from the brake 5 by opening the solenoid valve 3b will be returned to the reservoir 6, and be sucked by the hydraulic pump 4 during pressurizing as necessary and sent to a hydraulic circuit from the master cylinder 2.

For such a brake device, the brake squeal control device is structured with a stepping force sensor 11, the wheel speed sensors 12 (12a–12d), the solenoid valves 3a, 3b, etc. In addition to the above sensors, detection signals from various temperature sensors are sent to the control circuit 20, in which based on the detection signals from these sensors, the solenoid valves 3a, 3b are controlled to control brake squeals. A program for squeal control will be described later.

As the sensor group for the travel state, the stepping force sensor 11 and the wheel speed sensors 12a–12d are provided. As the sensor group for sensing temperatures, an engine cooling water temperature sensor 15, a vehicle room temperature sensor 13 and an outer air temperature sensor 14 are provided. These sensors are sensors for detecting "in-the-cold" and "first-in-the-morning" conditions in which brake squeals tend to occur. They become measurable state simultaneously with the closing of the starter switch 10 of the vehicle X. Travel time is also measured. The travel time is measured by a program in the control circuit 20 or a counter based on signals from a reference clock 21 for generating reference timing signals in the control circuit 20. Also, the frequency of brakings is counted by computing based on signals from the stepping force sensor, while the travel distance is measured by computing based on signals from the wheel speed sensors 12 (12a–12d).

In the thus structured brake squeal control device of the first embodiment, squeal control is carried out as follows. As described above, in this embodiment, first, the "in-the-cold" and "first-in-the-morning" conditions are detected by various sensor signals and clock signals. First in the morning and when relatively weakly braked while the brake pad surfaces of the vehicle is cooling from high temperature, brake squeal phenomena tend to occur. If as the travel state, the temperature of engine cooling water, vehicle room temperature and outer air temperature are below predetermined values, and the braking frequency, travel time, travel distance, total braking time and total braking distance are below predetermined values, the "in-the-cold" and "first-in-the-morning" conditions are met.

If the state in which the "in-the-cold" and "first-in-the-morning" conditions are met is detected, even during braking through the solenoid valves 3a, 3b, the solenoid valve 3b on the discharge side will be opened to reduce the brake pressure, thereby controlling brake squeals. In this case, the degree of opening of the solenoid valve 3b on the discharge side is not kept open completely but is opened only for a short time (e.g. only several seconds) to such an extent that squeals disappear and is closed again for braking.

Figure 3:
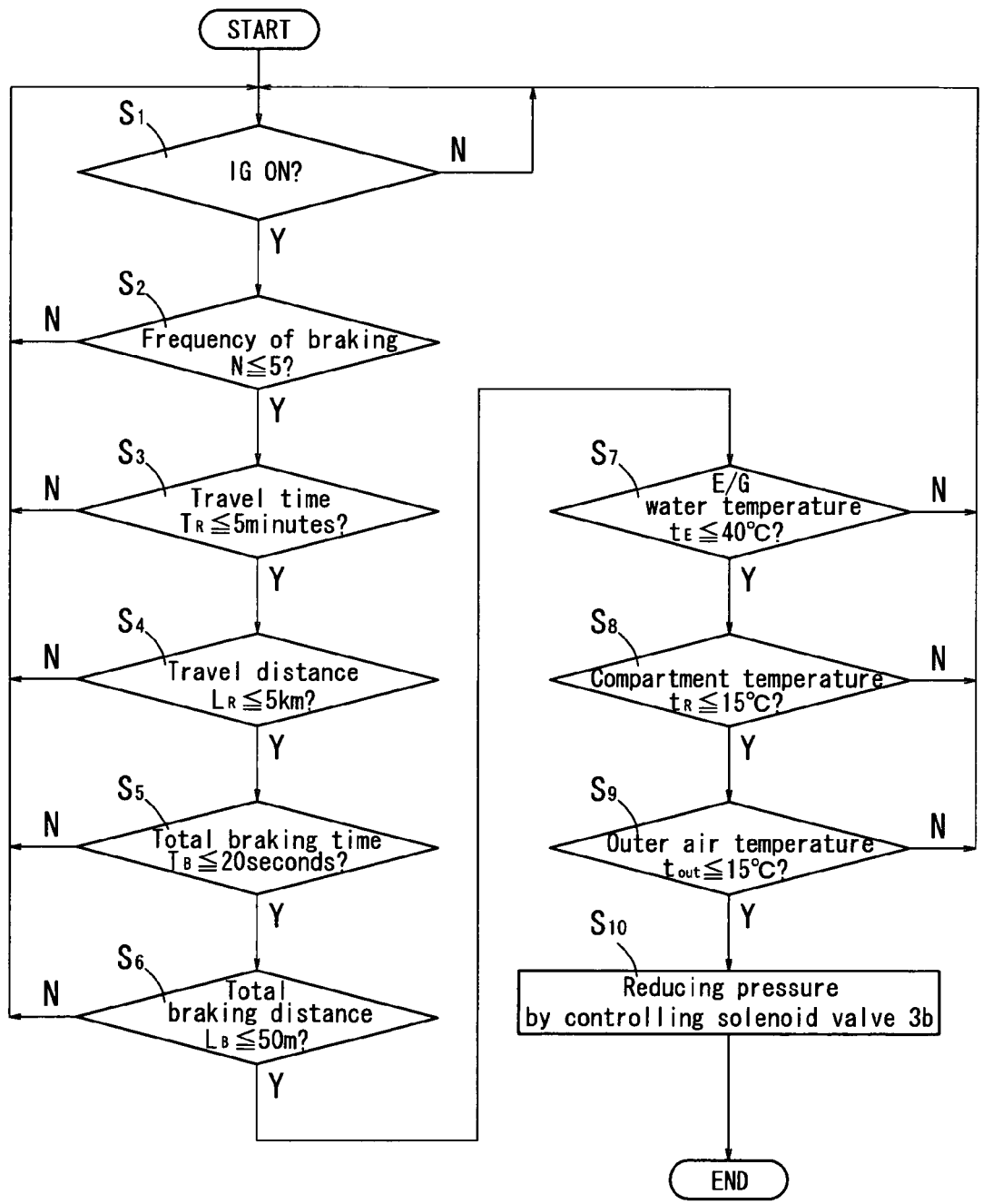
FIG. 3 is a flowchart of brake squeal control.

Such brake squeal control will be specifically described with reference to FIG. 3. First in step S1, confirmation is made on whether the ignition switch (abbreviated to IG), which is the starter switch of the vehicle, is on. In S2–S6, the travel state of the vehicle is checked. Checking is made first on whether the braking frequency N is not more than 5 (in S2), whether the travel time TR is not more than 5 minutes (in S3), whether the travel distance LR is not more than 5 km (in S4), whether the total braking time TB is not more than 20 seconds (in S5), and whether the total braking distance LB is not more than 50 m (in S6).

As for the braking frequency N, each time when a signal indicating that the brake pedal 1 has been stepped is sent from the stepping force sensor 11, the signal is counted, and the frequency is added. As for the travel time TR, when signals from the wheel speed sensors 12a–12d begin to be sent to the control circuit 20, counting of the timer time based on the reference clock signal is started to measure the time. As for the travel distance LR, too, the travel signal is integrated to measure the distance corresponding to the travel time TR. For the total braking time TB, the travel time TR is divided by timing signals at the beginning and end of braking, and the total braking distance LB is obtained from the travel distance for the period of time during which measurement is made.

Next, the temperature conditions are detected in S7–S9. Determination is made on whether the temperature t of engine cooling water is not more than 40° C. (in S7), whether the temperature tR in the vehicle room is not more than 15° C. (in S8), and whether the outer air temperature tout not more than 15° C. (in S9). The cooling water temperature is measured based on the signal from the temperature sensor 15 provided near the engine inlet of the cooling water piping provided on the engine (E/G). There is no need to describe the vehicle room and outer air temperature sensors. If it is detected that the travel states and the temperature conditions are not more than the preset values, in S10, the solenoid valve 3b is turned on and off to reduce the pressure for brake squeal control. Thus, this squeal control is carried out if the above squeal suppressing conditions are met, irrespective of whether brake squeals have been actually produced.

In the illustrated embodiment, the brake device is of a type in which hydraulic pressure is recovered by a hydraulic pump and a reservoir. But it may be a hydraulic pressure recovering type comprising a hydraulic pump and an accumulator. In this case, a type may be used in which brake squeals are controlled by increasing the brake hydraulic pressure.

Further, instead of the above specific control, squeal control may be carried out by exerting a reverse piezoelectric effect by means of the piezoelectric element disclosed in JP patent publication 4-54325. In this case, too, measurement is made on whether predetermined squeal conditions are met by the detection circuit of FIG. 3, and control is carried out to cancel squeals by exerting the reverse piezoelectric effect of the piezoelectric element as the specific control in S10. This brake squeal control is also applicable to brake means of an electric brake type in which no brake hydraulic circuit is used.

Figure 4:
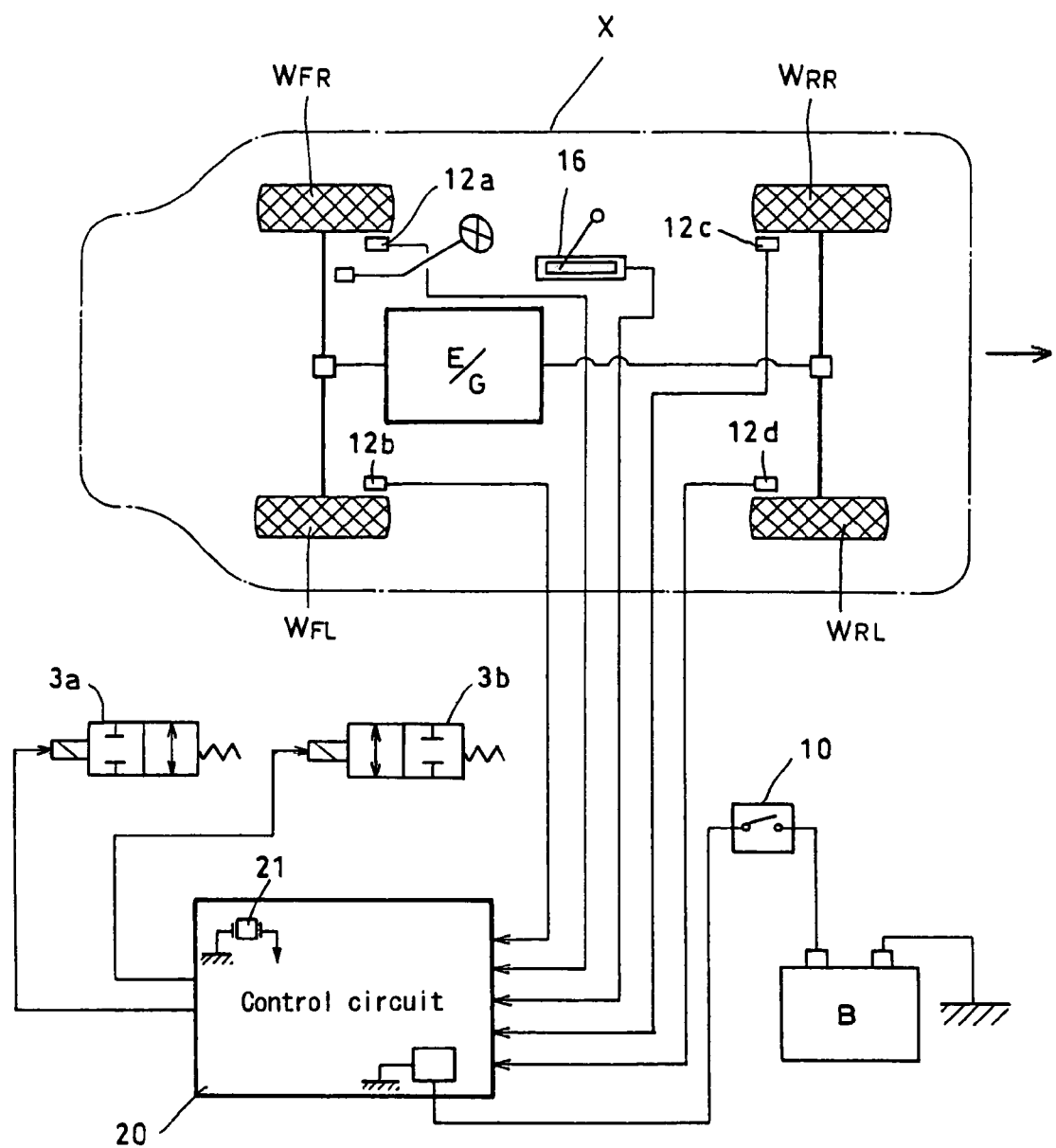
FIG. 4 is a schematic view showing the structure of the brake squeal control device during reversing.

FIG. 4 shows a schematic diagram of the brake squeal control device of the second embodiment. It shows a schematic diagram of the brake squeal control device during backward movement. In this control device, wheel speed signals from the wheel speed sensors 12a–12d and a lever position signal from a transmission shift lever 16 are sent to the control circuit 20 to detect the state during backing, and control of increasing or reducing the brake pressure is carried out through the solenoid valves 3a, 3b.

For the detection of backing of the vehicle, after confirming that the ignition switch 10 (IG), which is the starter switch of the vehicle, is on, it is detected that the vehicle is in the backing state by detecting that the lever position signal of the shift lever 16 is in a reverse position and detecting the wheel speed signals of the wheel speed sensors 12a–12d by the control circuit 20. In this case, too, irrespective of existence or non-existence of brake squeals, brake squeal control is carried out through the solenoid valves 3a, 3b. This brake squeal control is carried out in the same manner as in the first embodiment. If the backing state is detected by use of the signals of the wheel speed sensors, the use of active wheel speed sensors which can detect the rotating direction of the wheels, are preferable.

Figure 5:
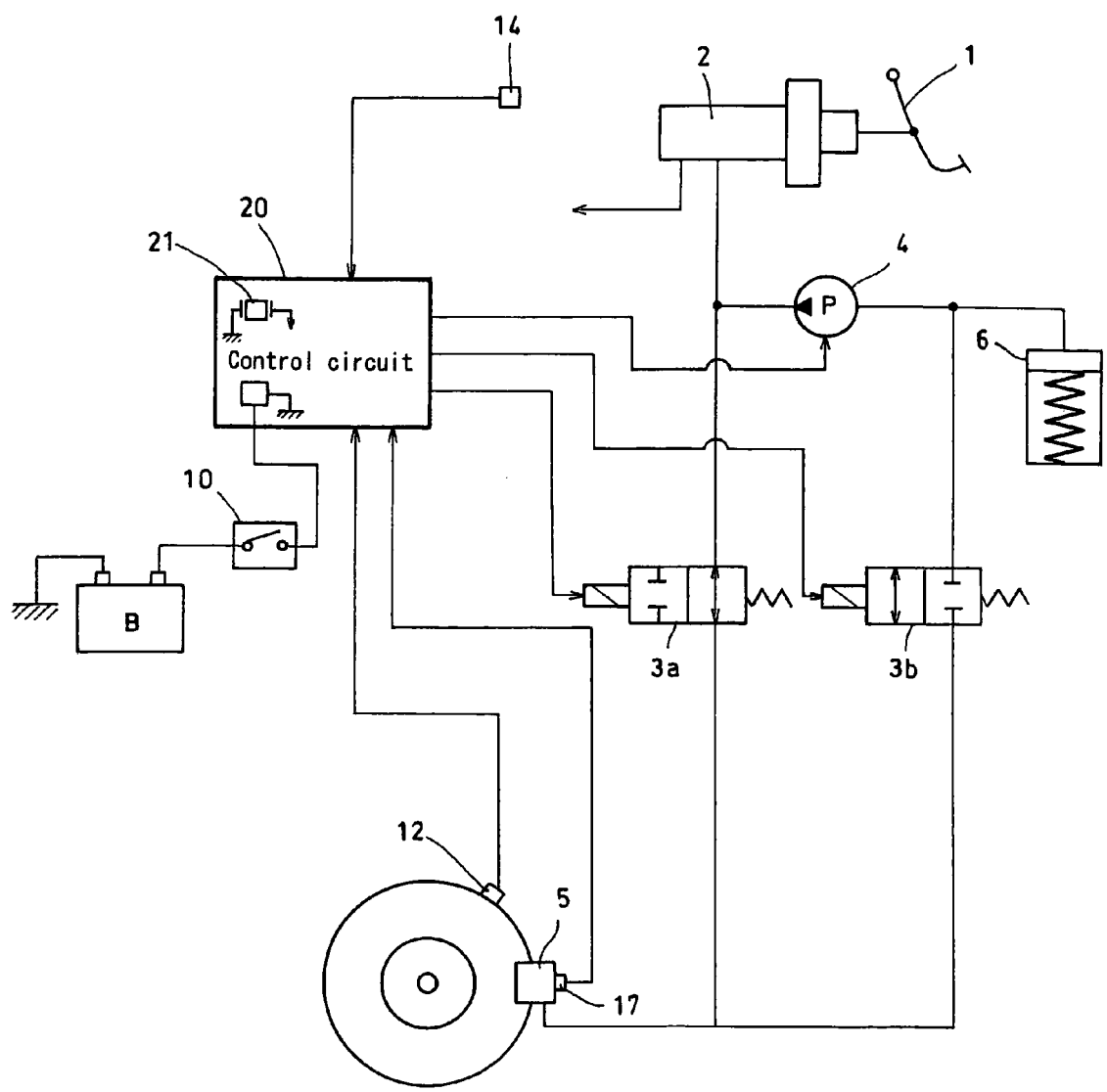
FIG. 5 is a schematic view of a brake device having the vehicle squeal control device of a third embodiment.

FIG. 5 shows a schematic diagram of the control device for controlling the brake device of the third embodiment. Like the first and second embodiments, the brake device is of a type in which a known disk brake type brake means is actuated by a hydraulic circuit. This brake device is the same in basic structure as the brake means of the first and second embodiments. Thus, the same numerals are used to the same members, and their detailed description is omitted.

Figure 6A:
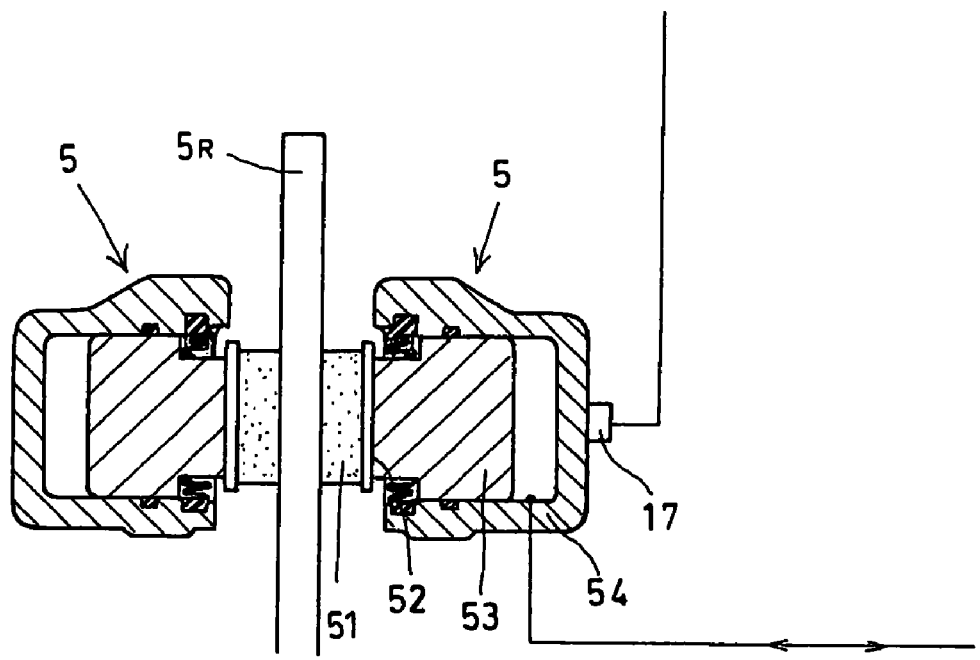
FIGS. 6A and 6B are sectional views of an example of a disk brake.

But in the disk type brake 5, as shown in FIG. 6A, a pair of calipers are provided symmetrically with a disk pad 51 mounted through a pad backing metal 52 to a piston 53 slidably provided in a brake cylinder 54 so that the rotation of the wheel is braked by pressing the disk pads 51 against the rotor 5R. The disc brake is not limited to the illustrated type, but may be of any other type.

For the brake device, the vehicle brake squeal control device includes a starter or ignition switch 10 for starting the engine, a caliper temperature sensor 17 for detecting the caliper temperature, an outer air temperature sensor 14, wheel speed sensors 12 for detecting the wheel speeds, a control circuit 20 for performing predetermined computation based on signals from the switches and sensors and sending control signals, and solenoid valves 3a and 3b controlled by the control signals.

For the control circuit 20, an ordinary microcomputer having a central computing processing unit CPU, a fixed memory portion ROM, and a temporary memory portion RAM. The control circuit 20 incorporates a program for measuring the non-use period from the start by the starter switch 10 to the next start based on clock signals from a reference clock 21 for generating reference signals. Also, the program for performing brake squeal control is described below.

The program for brake squeal control is structured to output a control signal for brake control in the cold of calipers by the signals from the caliper temperature sensor 17 and the outer air temperature sensor 14 after closing the starter switch 10, or if detection is made that the vehicle is started after left for a long time and the period from the end of previous travel to the start this time is not less than a predetermined value. The cold state of the calipers means that the temperatures Tc measured by the caliper temperature sensor 17 and the outer air temperature sensor 14 are both e.g. not more than 15° C. Also, for the detection of start after being left for a long time, the time from the end of previous travel to the start this time is measured by the signal from the starter switch 10 and the reference signal of the clock 21 or by an external time measuring signal, and if it is longer than a predetermined period, e.g. one month, it determined that it is a start after being left for a long time.

Squeal control in the cold state of the calipers or upon detection of start after being left for a long time is carried out by minute brake control. This minute braking is carried out by feeding hydraulic pressure by the hydraulic pump 4 with no stepping of the brake during travel to press the pistons 53 of the brake 5 to press the pads 51 only by a minute amount against the rotor 5R so that a suitable amount of braking force is applied. A program for carrying out such a control is contained in the brake squeal control program.

In the thus structured brake squeal control device of the third embodiment, brake squeal control is carried out as follows. Description is made with reference to the flowchart of FIG. 7. In the brake squeal control of this embodiment, after closing the starter switch 10 and confirming that the starter switch has been closed in step S1, confirmation is made in S2 on whether the calipers are in the cold. Confirmation of the cold of the caliper is made by detecting whether the measured temperatures Tc of the caliper temperature sensor 17 and the outer air temperature sensor 12 are not more than the respective preset temperatures (e.g. 15° C.). Otherwise, it is confirmed whether it is a start after being left for a long time.

The start timing is confirmed by measuring the period from the end of previous travel (e.g. when the starter switch 10 is turned off) to the closing of the starter switch 10 this time by the reference clock 21 or by an external time measuring signal, and by confirming whether this period has passed the preset period, e.g. one month. If one of the above two conditions is met, it proceeds to S4 where it is confirmed whether the vehicle is in the travel state, and squeal control is carried out in S5. Confirmation of the travel state is made by checking whether the travel speed vc is not less than the minimum speed V0 (e.g. 1 km/Hr), by the signals from the wheel speed sensors 12.

If confirmation of the travel state is made, it proceeds to S5 to carry out squeal control. The squeal control is carried out by minute brake control while the brake pedal 1 is not being stepped during travel. In minute brake control, a control signal is sent from the control circuit 20 to the hydraulic pump 4 in spite of the fact that the brake pedal 1 is not stepped, to produce hydraulic pressure and feed it to the brake 5, thereby pressing the pistons of the brake by a minute amount to bring them into light contact with the rotor 5R. By the minute brake control, the disk pads 51 are brought into contact with and abraded against the rotor 5R to heat the disk pads 51, thus imparting preheat to the caliper.

Figure 6B:
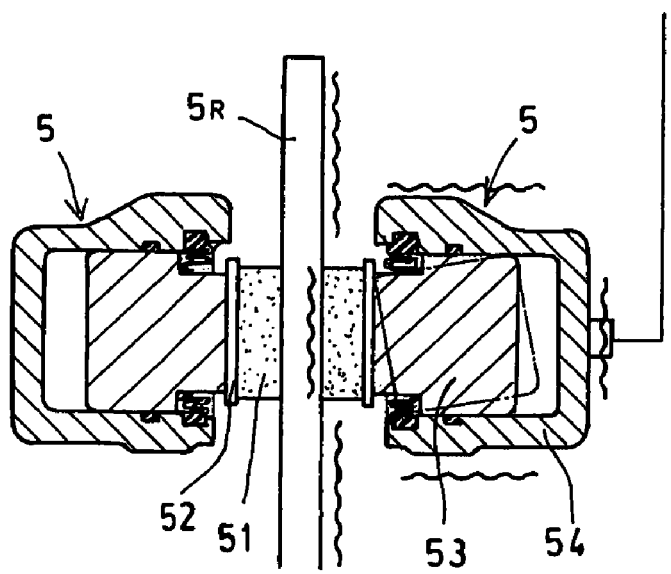

By imparting preheat, the hardness of the rubber seals of the pad backing metals 52 will decrease, and preheat is given to grease applied to sliding portions between the pistons 53 and the brake cylinders 54 and fluid in the brake cylinders 54 to reduce the viscosity, thereby quickly returning the friction of the pistons 53 to a normal state to change squeal producing conditions so that development of squeals will decrease. If such preheat is not given, as shown in FIG. 6B, the pistons would be deformed due to starting friction and squeals occur. This is eliminated by imparting preheat.

In the above embodiment, squeal control is by minute brake control. But it may be by minute vibration control of the pistons. In this case, it does not necessarily have to be during travel but minute vibration control may be carried out while the vehicle is at a stop. Also, this minute vibration control is also carried out while the brake pedal 1 is not being stepped in. Hydraulic pressure by the hydraulic pump 4 is fed to the brake 5, and opening and closing of the solenoid valve 3b, which is on the discharge side, are repeated in a short time to apply hydraulic pressure so that the pistons 53 will repeat reciprocating motion in a minutely vibrating state. The operation of the pistons 53 will be in the same manner as in the third embodiment due to sliding heat buildup of the pistons 53.

Figure 7:
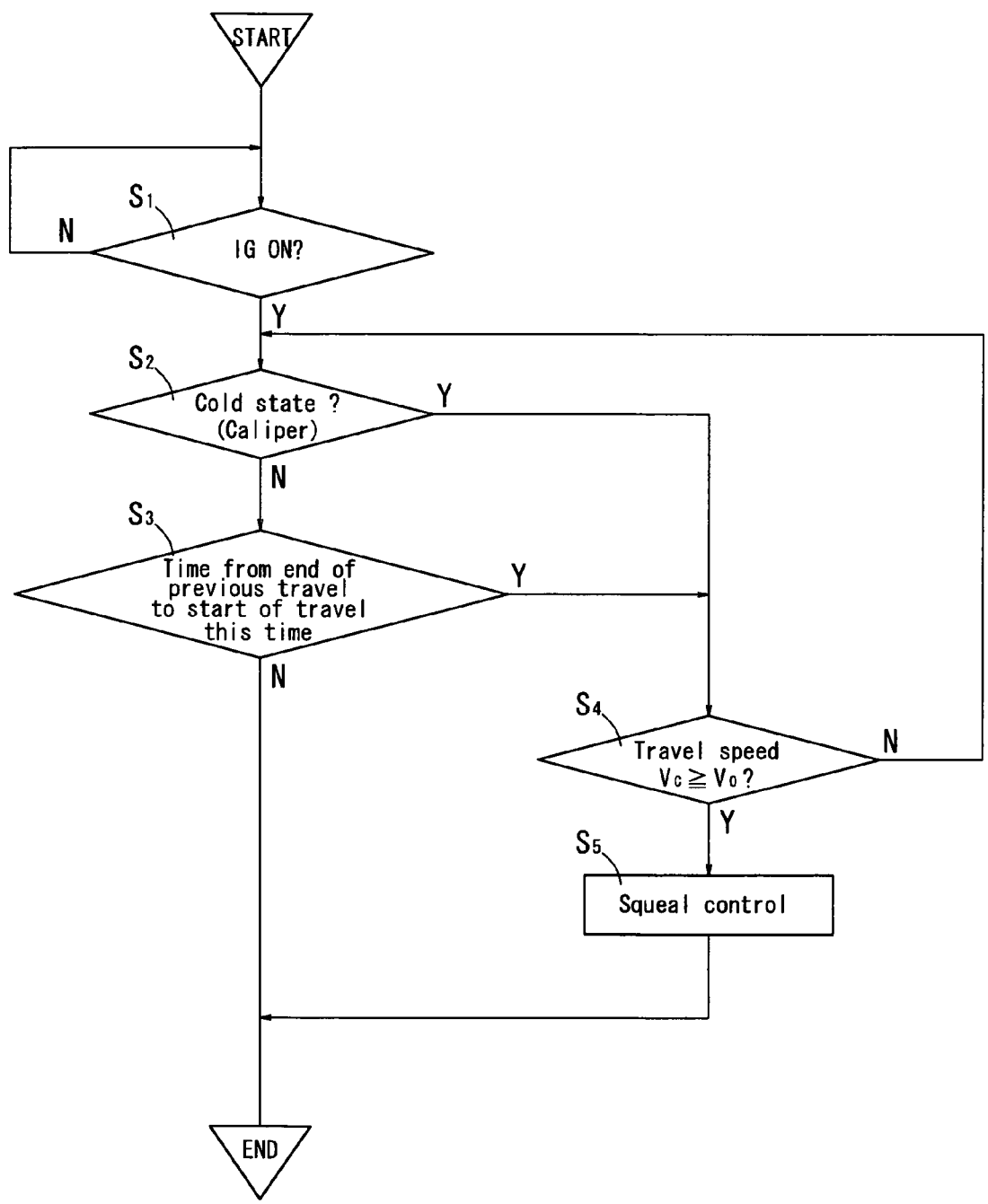
FIG. 7 is an explanatory view of operation.

The minute vibration control of this embodiment is the same as the third embodiment in that it is carried out in the cold of the calipers or at the start after being left for a long time. Thus the structure of FIGS. 5 and 6 is completely the same. In the flowchart of FIG. 7, too, judgment at the travel speed Vc in S4 is the judgment while the vehicle is at a stop or traveling, and it differs only in that in S5, squeal control is carried out by minute vibration control.

What is claimed is:

1. A brake squeal control device wherein after closing a starter switch of a vehicle, based on signals of sensors and a clock, if it is detected that the vehicle is in predetermined "in-the-cold" or "first-in-the-morning" state from the fact that at least one of time, travel state and temperature conditions is in predetermined ranges, the pressing force of a brake means is controlled to suppress brake squeals, wherein brake squeal control is carried out irrespective of whether brake squeal phenomena have actually developed or not.

2. A brake squeal control device as claimed in claim 1 wherein the pressing force of said brake means is adjusted by increasing or decreasing the brake hydraulic pressure to suppress brake squeals.

3. A brake squeal control device as claimed in claim 1 wherein said "in-the-cold" and "first-in-the-morning" states are detected by use of signals from sensors in a sensor group that indicate a travel state and sensors in a temperature sensor group that indicate a temperature state.

4. A brake squeal control device as claimed in claim 3 wherein said sensors in said sensor group which indicate a travel state comprise wheel speed sensors for measuring wheel speeds, and a stepping force sensor for sensing a brake stepping force, and said sensors in said sensor group which indicate a temperature state comprise a temperature sensor for engine cooling water, a vehicle compartment temperature sensor, and an outer air temperature sensor.

5. A brake squeal control device as claimed in claim 4 wherein the frequency of brakings is measured based on signals from said stepping force sensor, the travel time and travel distance are measured based on signals from said wheel speed sensors, and the total braking time and the total braking distance are measured based on the signals from said stepping force sensor and said wheel speed sensors.

6. A brake squeal control device wherein after closing a starter switch of a vehicle, if a signal of a sensor that indicates that the vehicle is in a reverse state is detected, the pressing force of a brake means is controlled to suppress brake squeals, wherein brake squeal control is carried out irrespective of whether brake squeal phenomena have actually developed or not.

7. A brake squeal control device as claimed in claim 6 wherein as said sensor for detecting the reversing state, a wheel speed sensor which can detect the rotational direction of the wheel is used.

8. A brake squeal control device as claimed in claim 1 wherein the pressing force of said brake means is controlled by giving a control signal for imparting minute brake actions to said brake means during travel to preheat said brake means.

9. A brake squeal control device as claimed in claim 1 wherein the pressing force of said brake means is controlled by giving a control signal for imparting minute vibrating brake actions to said brake means during travel or while the vehicle is at a stop to preheat said brake means.

10. A brake squeal control device as claimed in claim 1, further comprising a sensor for detecting that the caliper is in a cold state, said sensor comprising a caliper temperature sensor and an outer air temperature sensor.

* * * * *